May 8, 1962 J. G. KNOWLES 3,032,995
HYDRAULIC BRAKE SYSTEMS
Filed June 16, 1959
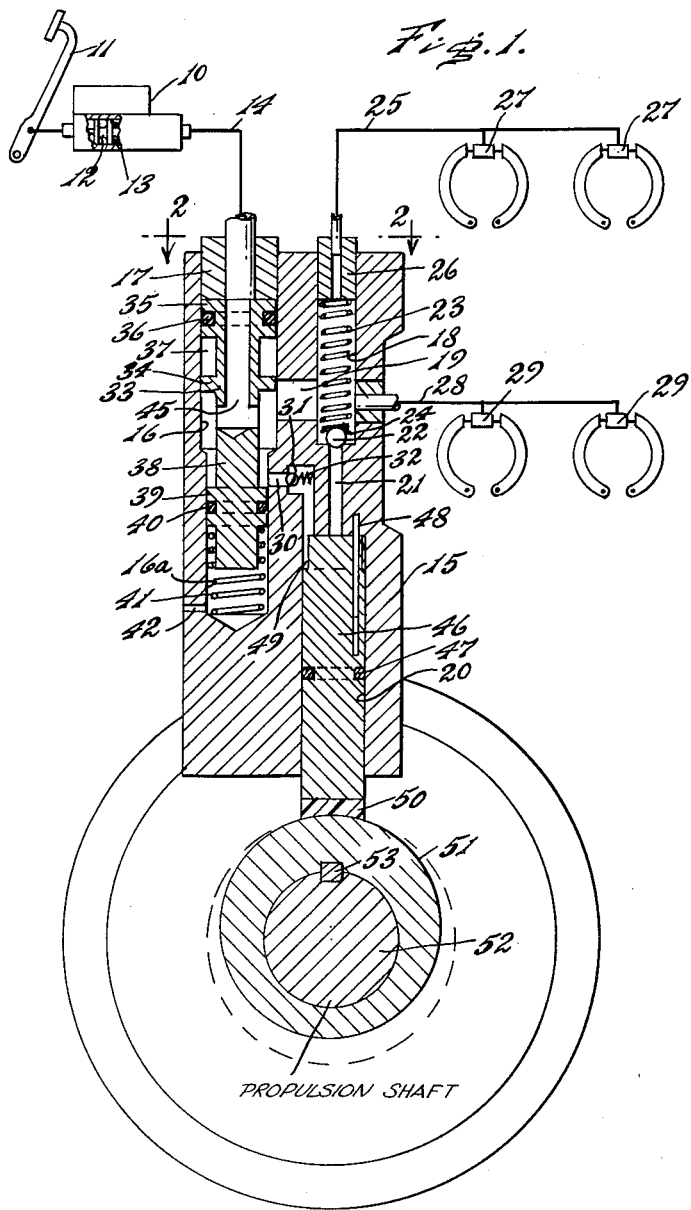
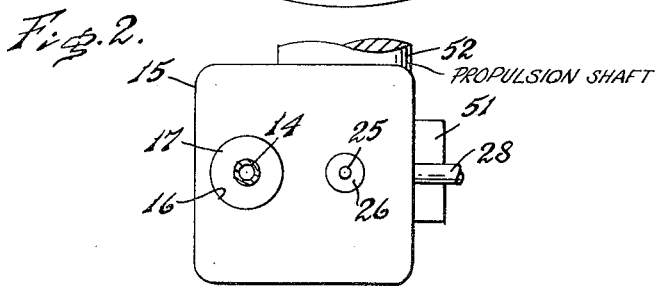
INVENTOR
John G. Knowles
BY
B. T. Wolgemuth
ATTORNEY 3,032,995
HYDRAULIC BRAKE SYSTEM
John G. Knowles, 992 Huntingdon, Huntingdon
Valley, Pa.
Filed June 16, 1959, Ser. No. 820,810
4 Claims. (Cl. 60—54.5)

This invention relates to hydraulic brake systems and more particularly to hydraulic brake systems suitable for operating the service brakes of motor vehicles.

It is the principal object of the present invention to provide a hydraulic brake system which is relatively simple in construction and has a relatively small number of parts, but which is very effective in its operation.

It is a further object of the present invention to provide a hydraulic brake system for the controlled application of a braking force, and in which the braking force may be applied as desired at the brakes.

It is a further object of the present invention to provide a brake system for vehicles in which movement of the vehicle is utilized for providing a brake applying force.

Other objects and advantageous features of the invention will be apparent from the description and claims.

The nature and characteristic features of the invention will be more readily understood from the following description, taken in connection with the accompanying drawings forming part thereof, in which:

FIGURE 1 is a diagrammatic view of a brake system in accordance with the invention; and FIG. 2 is a horizontal sectional view taken approximately on the line 2—2 of FIG. 1.

It should, of course, be understood that the description and drawings herein are illustrative merely, and that various modifications and changes can be made in the structure disclosed without departing from the spirit of the invention.

Referring now more particularly to the drawings, a master brake cylinder of conventional type is illustrated at 10, and is provided with the customary foot pedal 11 for application of force on a piston 12 and against a return spring 13 for the delivery of fluid under pressure as determined by the depression of the foot pedal 11. The master brake cylinder 10 is connected by a fluid connection 14 to a housing 15.

The housing 15 has an elongated bore 16 with a portion 16a of reduced diameter, the end of the bore 16 having a closure plug 17 therein through which the fluid connection 14 is connected to the interior of the bore 16.

The housing 15 is also provided with a bore 18 which is connected to the bore 16 by a passageway 19 in the housing 15, and a bore 20 which is connected to the bore 18 by a passageway 21 in the housing 15.

A check valve ball 22 is provided seating at the upper end of the bore 21, the ball 22 being urged to closed or seated condition by a spring 23 bearing on a ball impeller 24.

The bore 18 has a fluid connection 25 extending from an end closure plug 26 therein to the pressure fluid responsive operating means 27 for the front brakes of the vehicle.

The bore 18 also has a fluid connection 28 communicating therewith and extending to the pressure fluid responsive operating means 29 for the rear brakes of the vehicle.

A passageway 30 is also provided, in the interior of the housing 15, connecting the bore 20 and the bore portion 16a, a check valve ball 31 normally urged to closed position by a spring 32 being provided therein for permitting flow of fluid from the bore portion 16a to the bore 20 but preventing the return flow of fluid through the passageway 30.

Within the bore 16 and bore portion 16a, a valve plug 33 is provided having spaced guiding head portions 34 and 35 in engagement with the bore 16, a circumferential packing member 36, such as an O-ring, being provided in the head portion 35 for preventing fluid leakage. A pressure balancing groove 37 is also provided between the head portions 34 and 35.

The valve plug 33 has a stem portion 38 with an enlarged head 39 in engagement in the bore portion 16a. A packing member 40, such as an O-ring, is provided circumferentially at the head 39 for preventing fluid leakage at this location. A spring 41 in engagement at one end with the head 39, and at the other end with the lower terminal of the bore portion 16a is provided for normally urging the valve plug 33 upwardly. A vent opening 42 is provided at the lower end of the bore portion 16 for preventing fluid locking action below the head 39.

A passageway 45 is provided within the valve plug 33 extending through the head 35 for continuous communication with the fluid connection 14 and communicates with the bore 16 between the head 35 and the head 39 for establishing communication with the passageway 19.

The bore 20 has a piston 46 therein, the piston 46 having a packing 47, such as an O-ring, provided thereon for preventing fluid leakage therealong. A pin 48 mounted in the housing 15, and in loose engagement with the piston 46 is provided to prevent turning of the piston 46 in the bore 20.

The inner end 49 of the piston 46 may be of reduced diameter to prevent sealing of the passageway 30 by the piston 46 and the opposite or outer end of the piston 46 preferably has a facing 50 of Teflon or other suitable material.

Within the housing 15 an eccentric disc or cam 51 is provided on a shaft 52 and rotatable therewith by the key 53. The shaft 52 is preferably in the main drive of the vehicle beyond the clutch, the shaft 52 thus being connected in driving relation to at least certain of the wheels to which the brakes are to be applied as hereinafter explained.

The mode of operation will now be pointed out.

Assuming that no pressure is exerted on the foot pedal 11, the valve 35 will then be in the upper position shown, urged to that position by the spring 41. If the vehicle is moving, the shaft 52 rotates, carrying the cam 51 therewith. Any motion imparted to the piston 46 by the cam 51 is merely effective for pumping liquid in a circuit from the bore 20, through the passageway 21, past the non-return check valve 22, through the passageway 19, the portion of the bore 16 between the head 33 and the head 39, the passageway 30, and past the non-return check valve 31 to the bore 20. No pressure will be applied through the fluid connections 25 and 28, so that the pressure fluid responsive operating means 27 and 29 is not actuated for brake application.

If now it is desired to apply the brakes to a limited extent, the pressure exerted on the foot pedal 11 is effective for applying a pressure through the fluid connection 14 and through the passageway 45, the passageway 19 and the bore 18, and therefrom through the fluid connections 25 and 28 for pressure application at the pressure fluid responsive operating means 27 and 29. A moderate amount of braking may be effected in this manner, and without any assist from the action of the piston 46.

Upon further increase in pressure by increased movement of the foot pedal 11 and actuation of the piston 12, additional pressure is supplied through the fluid connection 14, and this tends to apply pressure on the valve 35, and against the force of the spring 41 to move the valve 35 downwardly to a position where the head 34 cuts off communication with the fluid passageway 19. The pumping action of the piston 46 then is effective for supplying fluid under increased pressure through the fluid connections 25 and 28 for brake application, the pressure applied by the pedal 11 being in effect the base pressure which is augmented by the pressure from the bore 20 delivered by the piston 46.

The pumping action of the piston 46 is of course discontinued when the shaft 52 is brought to rest by the application of the vehicle brakes.

Upon the release of the pedal 11, the valve 35 will be impelled upwardly by the spring 41 to again establish communication of the portion of the bore between the heads 34 and 39 with the passageway 19, fluid being returned to the master brake cylinder 10 upon the reduction of the force applied on the piston 12, to restore the conditions initially prevailing.

I claim:

1. Hydraulic brake apparatus for vehicles having wheel brakes and a driving shaft connected to the wheels comprising an operator controlled manually operable device for application of fluid pressure for braking, fluid pressure responsive brake applying means, and control mechanism interposed between said device and said brake applying means, said control mechanism including a housing having a valve bore therein, a first fluid connection from said device to said valve bore, a fluid pumping element having a cylinder and a piston reciprocable therein, said piston being movable in one direction by fluid pressure applied thereagainst and being movable in the opposite direction by said driving shaft, a second fluid connection in communication with said cylinder and said valve bore and having a pump inlet valve therein, a third fluid connection in communication with said cylinder and having a pump discharge valve therein, a fourth fluid connection in communication with said third fluid connection and with said brake applying means, an additional fluid connection connecting said valve bore and said fourth fluid connection, a valve member in said valve bore movable in one direction from one position to another, said valve member having a passageway therein in continuous communication with said first fluid connection and with the interior of said first bore, said valve member having a portion for cutting off communication between said valve bore and said additional fluid connection upon movement of said valve member to said other position, said valve member in said other position having its passageway communicating with said second fluid connection for fluid supply through said second fluid connection.

2. Hydraulic brake apparatus for vehicles having wheel brakes and a driving shaft connected to the wheels comprising an operator controlled manually operable device for application of fluid pressure for braking, fluid pressure responsive brake applying means, and control mechanism interposed between said device and said brake applying means, said control mechanism including a housing having a valve bore therein, a first fluid connection from said device to said valve bore, a fluid pumping element having a cylinder and a piston reciprocable therein, said piston being movable in one direction by fluid pressure applied thereagainst and being movable in the opposite direction by said driving shaft, a second fluid connection in said housing in communication with said cylinder and said valve bore and having a pump inlet valve therein, a third fluid connection in said housing in communication with said cylinder and having a pump discharge valve therein, a fourth fluid connection extending into said housing in communication with said third fluid connection and in communication with said brake applying means, an additional fluid connection in said housing connecting said valve bore and said fourth fluid connection, a fluid pressure responsive valve member in said valve bore movable in one direction from one position to another by fluid pressure applied thereagainst from said device through said first fluid connection, and a resilient member urging said valve member in the opposite direction, said valve member having a passageway therein in continuous communication with said first fluid connection and a passageway communicating with the interior of said first bore, said valve member having a portion for cutting off communication between said valve bore and said additional fluid connection upon movement of said valve member to said other position, said valve member in said other position having its passageway communicating with said second fluid connection for fluid supply through said second fluid connection.

3. Hydraulic brake apparatus for vehicles having wheel brakes and a driving shaft connected to the wheels comprising an operator controlled manually operable device for application of fluid pressure for braking, fluid pressure responsive brake applying means, and control mechanism interposed between said device and said brake applying means, said control mechanism including a housing, said housing having a valve bore therein with an extension of reduced diameter, a first fluid connection from said device to said valve bore, a second fluid connection from said second valve bore to and in continuous communication with said brake applying means, said housing having a second bore spaced from said valve bore and a first passageway connecting said second bore and said valve bore, said housing having a third bore spaced from said valve bore and a second passageway connecting said third bore and said second bore with a non-return valve therein, said housing having a third passageway connecting said bore extension and said third bore with a non-return valve therein preventing return flow through said third passageway from said third bore to said bore extension, a piston in said third bore movable in one direction by fluid pressure in said third bore and movable in the opposite direction by said driving shaft for increasing the fluid delivery to said second bore upon movement of said piston by said driving shaft, a fluid pressure responsive valve member in said valve bore movable in one direction from one position to another by fluid pressure applied thereagainst from said device through said fluid connection and having an opposed head portion extending into said bore extension, a resilient member urging said valve member in the opposite direction, said valve member having a passageway therein in continuous communication with said fluid connection and with the interior of said first bore, said valve member in one position establishing direct communication between said first fluid connection and said second fluid connection for manual brake operation, said valve member having a portion for cutting off communication between said first bore and said first passageway upon movement of said valve member to said other position, said valve member in said other position having its passageway communicating with said second fluid connection for fluid supply through said second fluid connection.

4. Hydraulic brake apparatus for vehicles having wheel brakes and a driving shaft connected to the wheels comprising an operator controlled manually operable device for application of fluid pressure for braking, fluid pressure responsive brake applying means, and control mechanism interposed between said device and said brake applying means, said control mechanism including a housing, said housing having a valve bore therein with an extension of reduced diameter, a first fluid connection from said device to said valve bore, said housing having a second bore spaced from said valve bore and a first passageway connecting said second bore and said valve bore, a second fluid connection from said second bore to and in continuous communication with said brake applying means, said housing having a third bore spaced from said other bores and a second passageway connecting said third bore and said second bore with a pump discharge valve therein preventing return flow through said second passageway from said second bore to said third bore, said housing having a third passageway connecting said bore extension and said third bore with a pump inlet valve therein preventing return flow through said third passageway, a piston in said third bore movable in one direction by fluid pressure in said third bore and movable in the opposite direction by said driving shaft for increasing the fluid delivery to said second bore upon movement of said piston by said driving shaft, a valve member in said valve bore movable in one direction from one position to another by fluid pressure applied thereagainst from said device through said first fluid connection and having an opposed head portion extending into said bore extension, and a resilient member urging said valve member in the opposite direction, said valve member having a passageway therein in continuous communication with said fluid connection and with the interior of said first bore, said valve member in one position establishing direct communication between said first fluid connection and said second fluid connection for manual brake operation, said valve member having a portion for cutting off communication between said first bore and said first passageway upon movement of said valve member to said other position, said valve member in said other position having its passageway communicating with said second fluid connection for fluid supply through said second fluid connection.

References Cited in the file of this patent

UNITED STATES PATENTS

| | | |
|---|---|---|
| 1,662,096 | Zelov | Mar. 13, 1928 |
| 1,664,680 | Hallett | Apr. 3, 1928 |
| 2,368,043 | Schnell | Jan. 23, 1945 |
| 2,396,897 | Stelzer | Mar. 19, 1946 |
| 2,402,115 | Levy | June 11, 1946 |
| 2,495,151 | Vickers | Jan. 17, 1950 |
| 2,636,349 | Schnell | Apr. 23, 1953 |

FOREIGN PATENTS

| | | |
|---|---|---|
| 222,412 | Switzerland | Oct. 16, 1942 |